Jan. 1, 1946. W. F. ROSS 2,392,002
GEAR FINISHING TOOL OF FORGED ANNULAR CONSTRUCTION
Filed Jan. 17, 1941
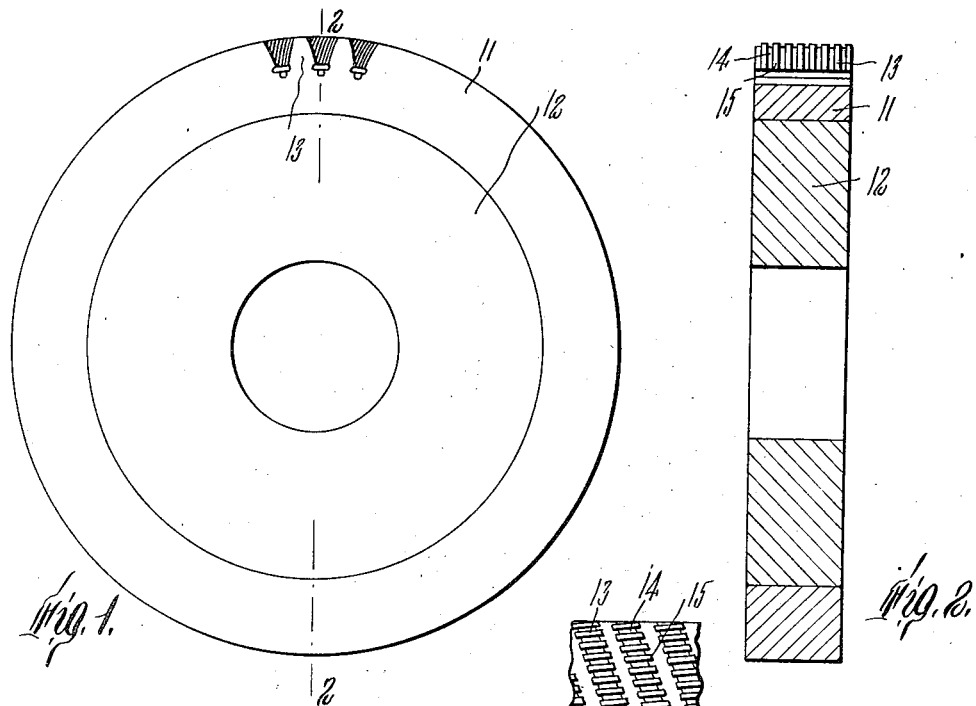
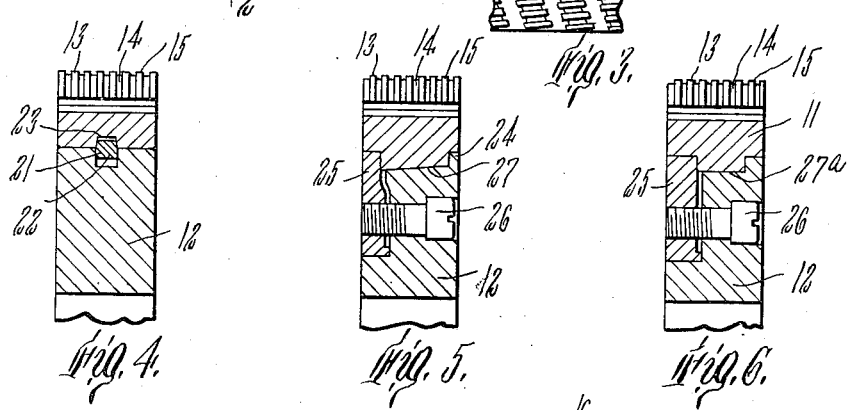
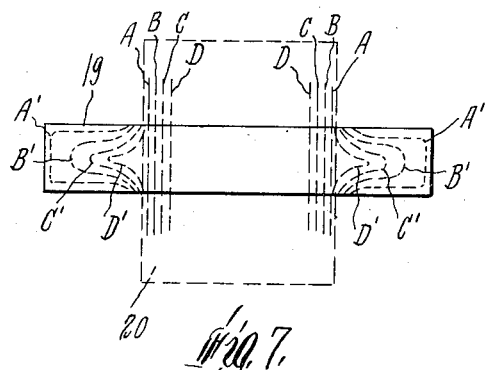
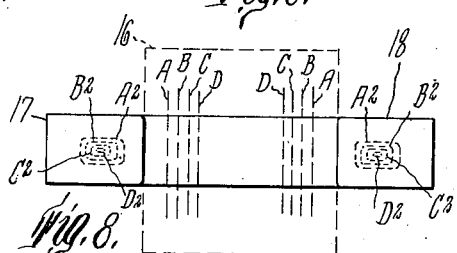
Inventor
Walter F. Ross Patented Jan. 1, 1946

2,392,002

UNITED STATES PATENT OFFICE 2,392,002

GEAR FINISHING TOOL OF FORGED ANNULAR CONSTRUCTION

Walter F. Ross, Springfield, Vt., assignor to The Fellows Gear Shaper Company, Springfield, Vt., a corporation of Vermont Application January 17, 1941, Serial No. 374,874

6 Claims. (Cl. 76—101)

The present invention relates to gear finishing tools, particularly those of the type known as gear shaving tools, which are characterized by teeth conjugate to the tooth forms of the gears which they are designed to finish, and having a plurality of grooves and intermediate lands, with cutting edges, in the sides of such teeth between their ends. It is concerned also with gear shaper cutters and similar tools of which the teeth extend in the general direction of the axis of the tool and are subjected to axially exerted force when performing their cutting action. Its object is to improve the internal structure of such tools, whereby to improve their cutting and wear resisting ability, and to effect substantially uniformity in these respects among different tools made of the same composition by like methods of manufacture, eliminating, in large part if not wholly, the variations and aberrations which have caused serious and unavoidable difficulties heretofore. It has secondary objects and advantages also, which are pointed out in the following specification.

Tools of this character are made of hard cutting materials including carbon steel and various alloy steels, of which the material known as high speed steel is an example and is particularly desirable on account of the fact that it retains its efficient hardness when heated to temperatures at which some other steels are annealed. High speed steel has a relatively high content of tungsten combined with carbon in the form of particles of tungsten carbide which are extremely hard and give the desired cutting ability to tools made of such steel. In the bar stock of this material as produced by the steel mills for users, the carbide particles lie in chain-like rows, called stringers, parallel to the axis of the bars, which chains or stringers are surrounded by softer and tougher metal. The stringers are more numerous near the surface of the bar than in the central part. These characteristics of internal structure are not exclusive with high speed steel, but exist in other alloy steels, carbon steel and other materials suitable for making edged cutting tools.

It has been the practice heretofore, when making gear shaving tools and other tools approximating a disk in form, to fashion a disk-like blank by cutting off from a bar of suitable steel composition, of which the diameter is less than that required for the blank, a section enough longer than the required thickness of the blank to provide a sufficient mass of metal, and then by hammering such piece endwise, while hot enough to be malleable, work it into a disk of the proper dimensions. Such disks are called pancake forgings. This procedure results in rearranging the stringers in a manner better suited for the production of satisfactory cutting tools than is the case in the bar stock. But it has limitations and faults, and experience has proved that gear shaving and cutting tools fashioned from disk or pancake forgings so made vary greatly in their cutting ability. Although many such tools have given highly satisfactory service by finishing hundreds of gears without resharpening, others made from blanks of identical composition by identical procedures of forging, machining, heat treating and finish grinding, have had to be resharpened after relatively short periods of service.

I have discovered that the cause of the unpredictable variation in the performance of shaving cutters so made is due to the flow line or grain characteristics of the chains of hard particles in pancake forgings, and have devised a means and procedure for overcoming this difficulty, which forms the subject matter of the present invention. In brief, the invention comprises a shaving cutter or the like in which the teeth are cut in the circumference of a ring made of material of the character hereinbefore described, which ring is so constituted by a forging treatment that the marginal zones are substantially homogeneous and free from the striations due to carbide stringers. It further comprises a tool composed of a toothed ring of this nature and a core or hub of steel or other material of different composition, having other physical characteristics. It further comprises the procedure of making such a tool. The particulars of the invention are more fully explained in the following specification with reference to illustrative drawing. Although, in such description and drawing, the application of the invention to the particular uses of a shaving tool is emphasized, it is to be understood that such emphasis is not a limitation of the scope of the invention or of the protection which I seek, for the same invention may be embodied in gear shaper cutters of the planing type, and other circular cutting tools of which the force application is in the axial direction, or has a large axial component, in performing the cutting action.

In the drawing—

Fig. 1 is an end view of a shaving tool embodying this invention;

Fig. 2 is an axial section of such tool taken on line 2—2 of Fig. 1;

Fig. 3 is a plan view of a tooth of the tool shown in the preceding figures as viewed radially toward the axis of the tool;

Figs. 4, 5 and 6 are fragmentary sectional views, similar to Fig. 2, showing different modes of connecting the tooth bearing ring of the tool with the core or hub;

Fig. 7 is a diagram showing the characteristics of flow lines or carbide stringers in disk forgings of the type heretofore used as blanks from which to produce shaving cutters, gear shaper cutters, and the like;

Fig. 8 is a diagrammatic view showing the flow line pattern in the ring forgings of which the toothed portions of my cutters are made.

The shaving tool shown in Figs. 1, 2 and 3 is made of a ring 11 of steel and a hub or core 12 which may be made of steel or other metal of any character or composition having sufficient strength and hardness for the purpose, and which preferably is obtainable at less cost than steel of the quality of that used in making the ring 11. Teeth 13 are cut in the circumference of the ring 11, and spaced grooves are cut in the side faces of such teeth, leaving lands 15 between them which have sharp edges at their intersections with the sides of the grooves. These teeth may be either helical or parallel to the axis of the tool. The outer surfaces of the lands 15 are segments of continuation tooth curves conjugate to the tooth faces of the gears upon which the tool is intended to be used in performing a finishing operation. In short, these teeth are of the character common to shaving tools for finishing gears and may have any of the characteristics suitable for tools of this type. It is to be understood without illustration that the entire circumference of the tool is provided with teeth, like the teeth 13, equally spaced apart from one another.

The ring 11 is forged from a section of a bar of high speed steel having a diameter less than that of the ring. A section long enough to provide the necessary mass of metal is cut from the bar and, while heated to a suitable temperature for working, is pierced centrally, expanded, and upset endwise until brought to rough ring form of prescribed approximate dimensions. Such bar section is shown in broken lines in Fig. 8 and designated 16. The radial sections of the forged ring at opposite sides of the axis are designated 17 and 18. In being worked to this shape, the ring is subjected to rapidly repeated violent hammer blows applied to the outer and inner circumferences and the end faces, that is, to all four sides of the sections, such as those shown at 17 and 18, cut by radial planes. As a result of this mode of working, the hard particles are broken up, separated, and scattered through the softer matrix to a considerable depth within all the bounding faces, and a very fine dense structure is obtained with an almost complete absence of stringers or flow lines in the regions where cutting edges will eventually be created.

The difference of internal structure between such a forging and the disk or pancake forgings heretofore used in making such tools, is illustrated by a comparison of Figs. 7 and 8. The disk 19 (Fig. 7) is produced by upsetting a section of high speed steel bar represented by broken lines at 20, and forging the outside circumference to approximately cylindrical form. In being thus worked, the carbide stringers shown by the broken lines A, B, C, and D, which extend parallel to the length of the bar and are more numerous in proportion to their distance from the axis, are offset and bent to shapes corresponding to the lines A', B', C' and D'. Actually the stringers are much more numerous and closer together than the lines thus represented and may be in the order of from 100 to 200 per inch. Sometimes the lines are unsymmetrical, due to unequal heating or working, with the result that one side of the disk is more homogeneous than the other. But in general the characteristic pattern of stringers in pancake forgings is substantially as represented here.

In the ring forging, the chains of hard particles are broken up and the particles are scattered and surrounded by the softer and tougher metal of the alloy for a considerable distance inward from the faces of the ring; i. e., to the depth to which the effect of hammering extends. To that depth, the metal is substantially homogeneous, having a very fine dense structure. Such stringers as are not thus broken up are brought to a pattern of closed lines, somewhat as indicated at $A^2$, $B^2$, $C^2$ and $D^2$, in the annular mid portion of the mass. An arrangement of stringers having the general characteristics of that so illustrated, existing in a localized core, is the only oriented grain structure of the forged ring. Teeth and cutting edges formed in the metal which has this dense and homogeneous internal structure have much better cutting ability than those which contain flow lines or chains of closely contiguous carbide particles. All ring forgings made of the same composition in the same way are substantially alike, wherefore cutting tools produced from such forgings, with teeth fashioned in the parts which have the homogeneous internal structure above described, are all substantially alike in their cutting and wear resisting ability.

The invention enables substantial savings in both labor and material to be effected in the production of cutters. Not only may perfectly adequate hubs be made from less expensive metal than high speed steel and other hard carbon or alloy steels, but, when the teeth have served out their useful life, the outer ring may be removed and a new one mounted on the same hub. This avoids the necessity of finishing the central hole to the great accuracy required in tools of this character, finishing the entire area of the end faces, and changing the data commonly applied to such tools, with each new toothed ring. The work of finishing a new ring is much less than that of finishing a complete tool, since the surface area to be ground is much less. Less precision is required of the inside circumference of the ring to fit the hub than is required for the hole in the hub. Concentricity of the teeth with the latter hole is obtained by finish grinding after the ring has been applied to the hub.

The toothed ring 11 may be united with the central hub 12 by being shrunk or tightly pressed on it. This is the mode of union shown in Figs. 1 and 2. Or, as shown in Fig. 4, the press fit connection may be reinforced by an expanding ring 21. Such ring is of spring metal, divided so that it may be distorted to reduce its diameter, contained in a circumferential groove 22 of the core, into which it may be compressed when the toothed ring is slipped on, and expanded by its resilience into an internal groove 23 in the toothed ring.

Figs. 5 and 6 show different embodiments in which the toothed ring has a press or slip fit with the hub and is confined between a shoulder 24 and a clamp ring 25 held by bolts 26. In the arrangement shown in Fig. 5, the contact surfaces 27 of the hub and ring are tapered, while in Fig. 6 the corresponding surfaces 27a are cylindrical.

The foregoing illustrations show some of the many ways in which the core and ring may be connected with provisions for renewal of the ring.

This invention is not limited to cutting tools of the shaving type only, but includes all cutters which may be made from ring forging, substantially according to the disclosure herein. Neither is it limited to tools with teeth on the outer circumference only. It includes also annular cutters with internal teeth; such as the shaving tool shown in the domestic patent of Edward W. Miller, No. 2,228,968, granted January 14, 1941, internal gear shaper cutters, and the like. The treatment given to the ring forging, as precedently described, condenses and compacts the carbide chains contiguous to the inner circumference, as well as the outer circumference, giving to teeth cut in the interior margin the same internal structure, uniformity, and ability to retain cutting edges as possessed by the external teeth described. Such an internally toothed tool ring may be combined with an external coaxial ring, in a manner the exact converse of the combinations above described, to constitute a composite tool, or it may be mounted directly in a chuck or other suitable holder for performing its cutting function.

The present invention applies to tools made of any of the compositions and materials suitable for edged cutting tools. Hence, while I claim as a specific embodiment of the invention, cutters in which the tooth-bearing portion is an annular forging of high speed steel, the generic protection which I seek includes similar forgings made of any of the suitable materials previously referred to.

What I claim and desire to secure by Letters Patent is:

1. The method of making a gear finishing tool, which comprises taking a section of a bar of metal containing hard particles in its internal structure, expanding such section outward from its axis, upsetting it endwise and fashioning it into a ring by hammer working while hot, and cutting teeth of a form conjugate to the teeth of the gear which the tool is designed to finish, in one of the marginal portions of said ring.

2. The method of making a gear finishing tool, which consists in taking a section of a bar of metal containing hard particles in its internal structure, expanding such section outward from its axis, upsetting it endwise and fashioning it into a ring by hammer working while hot, cutting teeth of a form conjugate to the teeth of the gear which the tool is designed to finish, in the outer portions of said ring, and fitting and securing said ring upon the interior hub or core.

3. The method of making a metal cutting tool, which comprises taking a section of a bar of metal containing hard particles in its internal structure, piercing such section axially and expanding it, upsetting it endwise and fashioning it into a ring by hammer working while hot, and fashioning cutting teeth in one of the marginal portions of said ring.

4. The method of making a gear finishing tool, which comprises taking a section of a bar of high speed steel, piercing said section axially in its central portion, expanding the section, upsetting it endwise and fashioning it into a ring by hammer working while hot, and making cutting teeth in one of the marginal portions of said ring.

5. The method of making a ring to be fashioned into a metal cutting tool, which consists in cutting a section transversely from a bar of high speed steel, centrally piercing such section in the axial direction, expanding the section radially and upsetting it endwise while hot by rapidly repeated violent hammer blows applied to the outer and inner circumferences and to the end faces, whereby the hard particles in the section are broken up, separated and scattered to a considerable depth within the bounding faces of the ring, with substantial absence of stringers or flow lines.

6. A cutting tool consisting of a ring of forged hard steel composition containing tungsten carbide and having cutting teeth in one of its margins, the composition of said ring and the marginal areas thereof, including the teeth, having a higher forged density than the interior of the ring with the carbide particles broken up and scattered in a substantially homogeneous and dense grain structure, the only oriented grain structure being in a localized core of the ring.

WALTER F. ROSS.